Patented Apr. 17, 1951

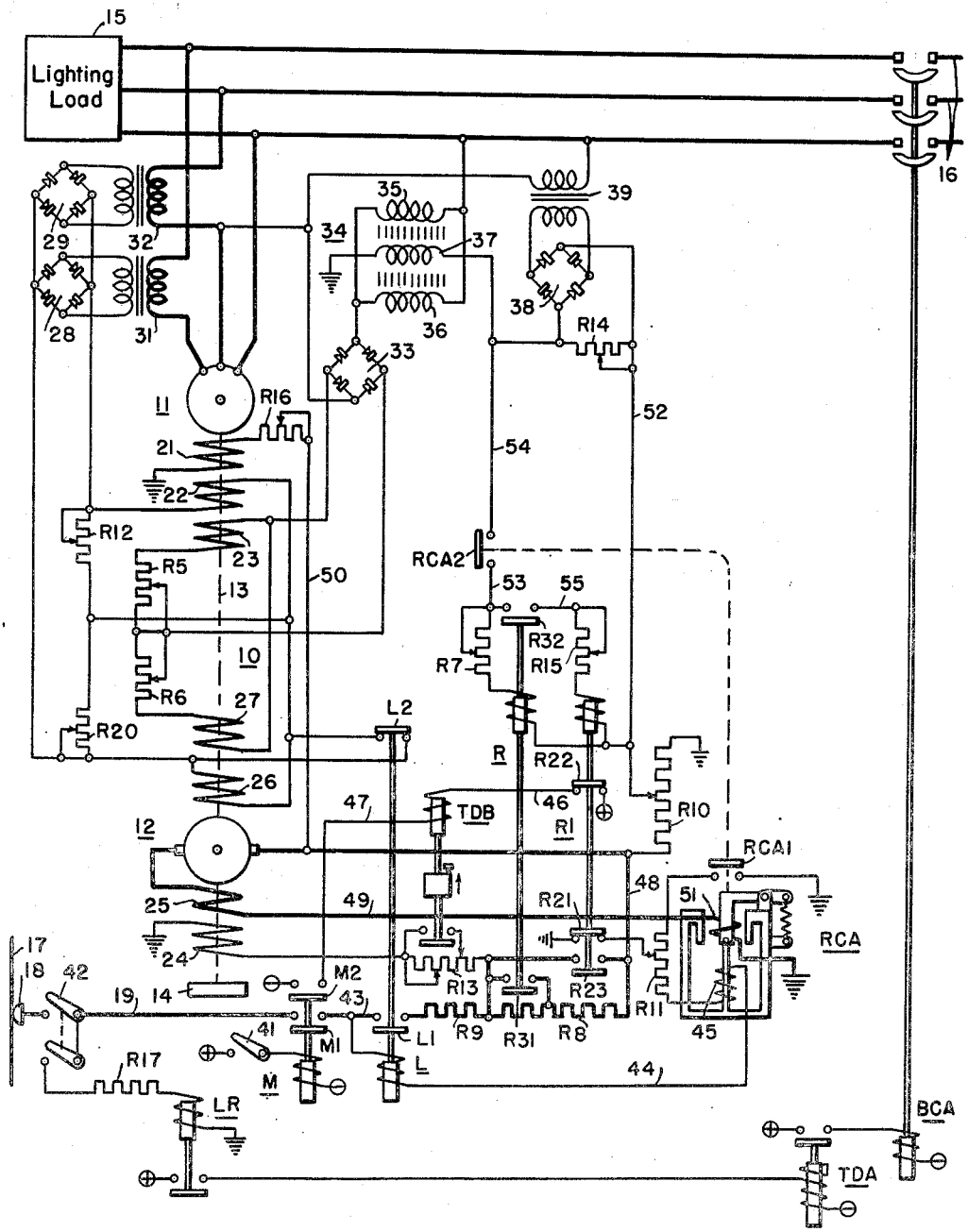

2,549,305

UNITED STATES PATENT OFFICE 2,549,305

MOTOR-ALTERNATOR CONTROL SYSTEM

Herbert W. Graybrook, Irwin, and Manley C. Potter, Turtle Creek, Pa., assignors to Westinghouse Electric Corporation, East Pittsburgh, Pa., a corporation of Pennsylvania Application March 17, 1950, Serial No. 150,224

7 Claims. (Cl. 322—4)

Our invention relates, generally, to control systems and, more particularly, to systems for controlling the operation of motor-alternators which receive power from a direct current source and deliver alternating current power to fluorescent lamps and other apparatus.

Modern subway cars are equipped with fluorescent lamps and other apparatus which require alternating current. This may be supplied by an alternating current generator driven by a direct current motor which is energized through a third rail having gaps therein which cause momentary loss of power to the motor.

An object of our invention is to prevent flickering of the lamps in a subway car when it passes over third rail gaps.

Another object of our invention is to provide for automatically controlling the starting and operation of a motor-alternator set.

A further object of our invention is to preserve the energy stored in a flywheel on a motor-alternator set to drive the set to supply power for the lighting load.

Still another object of our invention is to utilize the current generated by the motor for energizing a field winding of the alternator of the motor-alternator set when the car passes over a third rail gap.

Other objects of our invention will be explained fully hereinafter or will be apparent to those skilled in the art.

In accordance with one embodiment of our invention, the motor of a motor-alternator set is immediately disconnected from the line when the power is interrupted, as by a third rail gap, and the current generated by the motor, acting as a generator during coasting, is utilized to help maintain the excitation of the alternator field. All of the alternating current load except the fluorescent lamps is disconnected after a short time interval to preserve the flywheel energy of the set for supplying current to the lamps. The proper starting sequence is so set up when the third rail gap is encountered that the set is brought back on the line without flashing the motor after the gap is crossed.

For a better understanding of the nature and objects of the invention, reference may be had to the following detailed description, taken in conjunction with the accompanying drawing, in which the single figure is a diagrammatic view of a control system embodying the principal features of the invention.

Referring to the drawing, the system shown therein comprises a motor-alternator set 10 which, in turn, comprises an alternating current generator 11 driven by a direct current motor 12 through a shaft 13 to which a flywheel 14 is connected. The motor-alternator set 10 may be of the same general type as the motor-generator set disclosed in Patent No. 2,349,618, issued May 23, 1944, to H. W. Graybrook and C. J. Biscup. Certain modifications are made in the excitation of the field windings of the machines in the present application.

The alternating current generator 11 is utilized to supply alternating current to a lighting load 15 and through conductors 16 to an auxiliary load. Since the lighting load is composed primarily of fluorescent lamps, it is necessary to maintain the generator voltage substantially constant in order to prevent flickering of the lamps.

The power for operating the direct current motor 12 may be supplied through a third rail 17 which is engaged by a current collector 18. It is the usual practice in third rail systems to sectionalize the system by providing gaps in the third rail at certain intervals. Thus, it is necessary to maintain the voltage of the generator while crossing a third rail gap in order to prevent dimming of the lamps. In order to do this, the energy stored in the flywheel 14 is utilized to drive the motor-generator set while crossing a third rail gap. We have provided control means for disconnecting the motor from a power conductor 19 and for increasing the excitation of the direct current motor which functions as a generator to supply the excitation current for the alternator during the coasting period.

As shown, the alternator 11 is provided with a main field winding 21, a cumulative field winding 22 and a differential field winding 23. The motor 12 is provided with a main field winding 24, an interpole field winding 25, a differential field winding 26 and a cumulative field winding 27. During normal operation, the main field winding 21 of the alternator is energized from the direct current power source, a variable resistor R16 being provided to adjust the current in the main field winding. Likewise, the main field winding 24 of the motor 12 is energized from the direct current power source. A variable resistor R13 is provided for adjusting the current in the field winding 24.

In order to compensate for the tendency of the generator voltage and the motor speed to drop with an increase in the generator load, the cumulative field winding 22 of the generator 11 and the differential field winding 26 of the motor 12 are energized through rectifiers 28 and 29 which, in turn, are energized by means of current transformers 31 and 32, respectively, the primary windings of which are connected in the load circuit for the generator 11. Variable resistors R12 and R20 are provided for adjusting the current in the field windings 22 and 26, respectively.

Also, in order to compensate for changes in the voltage of the direct current source which would affect the speed of the motor and the voltage of the generator the differential field winding 23 of the generator and the cumulative field winding 27 of the motor are energized through a rectifier 33 which, in turn, is energized through a saturable reactor 34 having alternating current windings 35 and 36 connected to the generator load circuit and a direct current winding 37 connected to a rectifier 38.

As described in Patent No. 2,349,618, previously mentioned, the rectifier 38 is energized through a voltage transformer 39 which is connected across one of the phase voltages of the generator 11. The output voltage of the rectifier 33 is utilized in opposition to the voltage of the direct current power source to energize the saturation controlling winding 37 of the reactor 34. The voltage obtained from the direct current power source may be adjusted by means of a potentiometer resistor R10. This resistor may be adjusted to apply a certain voltage to the rectifier 38 and the saturating winding 37 when the line voltage is normal.

As described in the aforesaid patent, fluctuations from the normal voltage are compensated for by the reactor 34 which controls the energization of the rectifier 33, thereby controlling the excitation of the field windings 23 and 27 of the generator 11 and the motor 12, respectively. Variable resistors R5 and R6 are provided for adjusting the current in the field windings 23 and 27, respectively. A biasing resistor R14 is connected across the terminals of the rectifier 38.

As explained hereinbefore, it is necessary to disconnect the motor 12 from the power conductor 19 when crossing a third rail gap. This is accomplished by means of a reverse current relay RCA which controls the operation of a switch L. The relay RCA also controls the operation of switches R and R1 which shunt portions of a resistor R8 from the motor circuit after the motor has attained predetermined speeds. The switches R and R1 are so operated that the resistor R8 is reinserted in the motor circuit while crossing a third rail gap to prevent flashing of the motor when power is reapplied after the gap is crossed.

A switch M is provided for controlling the application of power to the motor generator set. The energization of the coil of the switch M may be controlled by manually operated switch 41. A double-pole manually operated switch 42 may be provided for controlling the energization of the power conductor 19 and also a line relay LR which is responsive to the voltage of the power source.

The contact members of the relay LR control the energization of a time delay relay TDA. The contact members of the relay TDA control the energization of a switch BCA which disconnects the auxiliary load from the generator a predetermined time interval, for example, one second after the line relay LR opens because of loss of voltage of the power source. A resistor R17 is provided in the circuit for the coil of the line relay LR.

A time delay relay TDB is provided for shunting a portion of the resistor R13 from the circuit for the main field winding 24 of the motor 12 to change the excitation of the motor, as will be explained more fully hereinafter. The energization of the coil of the relay TDB is controlled by contact members on the switches M and R1.

In order to operate the motor generator set 10, the manually operated switches 41 and 42 are closed, thereby energizing the switch M from a battery or other suitable control source and the line relay LR from the power source which supplies power through the third rail 17. The closing of the relay LR energizes the time delay relay TDA. The closing of the contact members of the relay TDA energizes the actuating coil of the switch BCA, thereby closing the switch to connect the auxiliary load to the generator 11.

The closing of the switch M energizes the coil of the switch L through a circuit which extends from the power conductor 19 through contact members M1, conductor 43, the coil of the switch L, conductor 44, a stationary coil 45 on the relay RCA, resistor R11 and contact members R21 to ground. The closing of the switch M also energizes the coil of the relay TDB through a circuit which extends from positive through contact members R22, conductor 46, the coil of the relay TDB, conductor 47 and contact members M2 to negative.

The closing of the switch L connects the motor 12 to the power source through a circuit which extends from the power conductor 19 through contact members M1 of the switch M, conductor 43, contact members L1, resistors R9 and R8, conductor 48, the armature winding of the motor 12, the interpole field winding 25, conductor 49 and a moving coil 51 on the relay RCA to ground.

At this time a portion of the resistor R13 is shunted by the contact members of the relay TDB, thereby applying full excitation current to the main field winding 24 of the motor 12. The main field winding 21 of the alternator 11 is also energized at this time through a circuit which extends from the conductor 48 through a conductor 50, the resistor R16 and the field winding 21 to ground. At this time contact members RCA1 and RCA2 of the reverse current relay are closed.

The motor-alternator set increases its speed until the voltage generated by the generator 11 when transformed by the potential transformer 39 and rectified by the rectifier 38 produces sufficient voltage across the coil of the switch R to operate this switch. The circuit for the coil of the switch R extends from one terminal of the rectifier 38 through conductor 52, the coil of the switch R, resistor R7, conductor 53, contact members RCA2 and conductor 54 to the other terminal of the rectifier 38.

The closing of contact members R31 of the switch R shunts a portion of the resistor R8 from the motor armature circuit, thereby increasing the voltage applied to the motor. The closing of contact members R32 establishes a circuit for the actuating coil of the switch R1 which extends from the conductor 52 through the coil of the switch R1, resistor R15, conductor 55 and contact members R32 to the conductor 53, thereby connecting the coil of the switch R1 across the rectifier 38.

When the voltage of the generator 11 reaches a still higher predetermined value, the switch R1 is operated to close its contact members R23, thereby shunting the remainder of the resistor R8 from the motor circuit. At this time the contact members R22 of the switch R1 are opened to deenergize the coil of the relay TDB. After a time delay of approximately two seconds, the contact members of the relay TDB are opened to insert the resistor R13 in the circuit for the main field winding 24 of the motor 12 thereby decreasing the field strength of the motor which increases the motor speed in a manner well known in the art. The contact members R21 are also opened at this time. However, the coil of the switch L remains energized through the circuit maintained by contact members RCA1 of the reverse current relay RCA.

As explained hereinbefore, the line relay LR is closed whenever third rail voltage is present at the car. Thus, the relay TDA is closed and the switch BCA is closed to connect the auxiliary load to the generator. The lighting load is also connected to the generator and the fluorescent lamps light when the alternator voltage reaches the proper value.

As also explained hereinbefore, the current transformers 31 and 32 and the rectifiers 28 and 29 function to control the excitation of the cumulative field winding 22 of the generator and the differential field winding 26 of the motor to compensate for fluctuations in the load on the generator, thereby maintaining substantially constant generator voltage. Also, the reactor 34 and the rectifiers 33 and 38 function to compensate for fluctuations in the line voltage applied to the motor by controlling the energization of the cumulative field winding 27 of the motor and the differential field winding 23 of the generator to help maintain a substantially constant generator voltage.

The reverse current relay RCA is utilized to secure quick opening of the switch L when the car enters a third rail gap. It is necessary for the switch L to be opened before the line relay LR can open as the motor 12, acting as a direct current generator, would supply voltage to hold the line relay LR closed.

When the car enters a third rail gap, thereby removing the applied voltage from the motor 12, the relay RCA normally opens its contact members before the current in the moving coil reaches zero. Should there be friction in the bearings the relay is forced open when the current in the motor armature and the moving coil 51 of the relay reverses, thereby causing the contact members of this relay to open. The opening of the contact members RCA1 interrupts the energizing circuit for the actuating coil of the switch L, thereby causing this switch to open to disconnect the motor 12 from the power conductor 19. The opening of the contact members RCA2 interrupts the energizing circuit for the switches R and R1 which open to reinsert the resistor R8 in the motor circuit to enable the motor to be brought back on the line without flashing after the third rail gap is crossed.

The closing of the contact members R22 on the switch R1 energizes the relay TDB, thereby closing its contact members to shunt a portion of the resistor R13 from the circuit for the field winding 24 of the motor. In this manner the voltage of the machine 12 which is now functioning as a generator is increased to supply the excitation for the main field winding 21 of the alternator.

Also, the closing of the contact members R21 establishes a circuit for the coil of the switch L to permit this switch to be reclosed upon the return of line voltage after the third rail gap is crossed. The closing of contact members L2 as a result of the deenergization of the coil of the switch L short-circuits the differential field winding 26 of the motor 12, thereby increasing the excitation of the motor 12 still further to increase its generated voltage for exciting the alternator 11.

As explained hereinbefore, the line relay LR is permitted to open after the switch L opens and this relay will remain open while the car is in the third rail gap. The relay TDA opens approximately one second after the opening of the contact members of the relay LR, thereby causing the switch BCA to open to disconnect the auxiliary load from the generator.

In this manner the stored energy in the flywheel 14 is preserved for operating the motor generator set to supply the lighting load while the car is in the third rail gap. If the car crosses the gap within the one second time interval, it is not necessary to disconnect the auxiliary load and the TDA relay functions to retain the connections for the auxiliary load for approximately one second.

The foregoing sequence of operations disconnects all the load from the generator except the lighting load, approximately one second after entering a third rail gap. It immediately increases the excitation of the direct current machine to support the alternating current generator voltage as the speed decreases. In addition, the starting sequence for the direct current machine as a motor is set up for reapplication of line voltage after the car crosses the third rail gap.

From the foregoing description of operation it is seen that the motor-alternator set is started by means of relays which automatically control its operation. When current from the direct current supply source is interrupted, as by a third rail gap, the control immediately disconnects the motor from the line so that current generated by the motor during coasting is utilized to supply the excitation for the generator.

Also, by shunting certain resistors and field windings, the voltage of the motor, which is acting as a generator during coasting, is increased to help maintain the desired alternator field excitation during the coasting time. All of the alternating current load except the fluorescent lamps, is disconnected after one second to preserve the flywheel energy for operating the motor generator set to supply the lighting load.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a control system, in combination, a direct current motor having an armature winding, a main field winding, a cumulative field winding and a differential field winding; an alternating current generator having an armature winding, a main field winding, a cumulative field winding and a differential field winding; a shaft connecting the motor and the generator; a flywheel connected to the shaft; a main load circuit and an auxiliary load circuit for the generator; a first switching means for connecting the auxiliary load circuit to the generator; a direct current power conductor; a second switching means for connecting the motor to the power conductor; rectifying means for energizing said cumulative and differential field windings from the generator; a reverse current relay responsive to the motor armature current for causing the opening of said second switching means; and relay means responsive to the voltage of the power conductor for causing the opening of said first switching means, said motor and generator being driven by stored energy in said flywheel and said main field windings being energized by current generated in said motor while it is disconnected from the power conductor.

2. In a control system, in combination, a direct current motor having an armature winding, a main field winding, a cumulative field winding and a differential field winding; an alternating current generator having an armature winding, a main field winding, a cumulative field winding and a differential field winding; a shaft connecting the motor and the generator; a flywheel connected to the shaft; a main load circuit and an auxiliary load circuit for the generator; a first switching means for connecting the auxiliary load circuit to the generator; a direct current power conductor; a second switching means for connecting the motor to the power conductor; rectifying means for energizing said cumulative and differential field windings from the generator; a reverse current relay responsive to the motor armature current for causing the opening of said second switching means; and time delay relay means for causing the opening of said first switching means after the interruption of power to the motor, said motor and generator being driven by stored energy in said flywheel and said main field windings being energized by current generated in said motor while it is disconnected from the power conductor.

3. In a control system, in combination, a direct current motor having an armature winding, a main field winding, a cumulative field winding and a differential field winding; an alternating current generator having an armature winding, a main field winding, a cumulative field winding and a differential field winding; a shaft connecting the motor and the generator; a flywheel connected to the shaft; a main load circuit and an auxiliary load circuit for the generator; a first switching means for connecting the auxiliary load circuit to the generator; a direct current power conductor; a second switching means for connecting the motor to the power conductor; rectifying means for energizing said cumulative and differential field windings from the generator; a reverse current relay responsive to the motor armature current for causing the opening of said second switching means; relay means responsive to the voltage of the power conductor for causing the opening of said first switching means, said motor and generator being driven by stored energy in said flywheel and said main field windings being energized by current generated in said motor while it is disconnected from the power conductor; a resistor for controlling the current in the motor main field winding; and switching means controlled by the reverse current relay for shunting said resistor.

4. In a control system, in combination, a direct current motor having an armature winding, a main field winding, a cumulative field winding and a differential field winding; an alternating current generator having an armature winding, a main field winding, a cumulative field winding and a differential field winding; a shaft connecting the motor and the generator; a flywheel connected to the shaft; a main load circuit and an auxiliary load circuit for the generator; a first switching means for connecting the auxiliary load circuit to the generator; a direct current power conductor; a second switching means for connecting the motor to the power conductor; rectifying means for energizing said cumulative and differential field windings from the generator; a reverse current relay responsive to the motor armature current for causing the opening of said second switching means; relay means responsive to the voltage of the power conductor for causing the opening of said first switching means, said motor and generator being driven by stored energy in said flywheel and said main field windings being energized by current generated in said motor while it is disconnected from the power conductor; a resistor for controlling the current in the motor main field winding; and time delay relay means controlled by the reverse current relay for inserting the resistor in the motor main field winding circuit.

5. In a control system, in combination, a direct current motor having an armature winding, a main field winding, a cumulative field winding and a differential field winding; an alternating current generator having an armature winding, a main field winding, a cumulative field winding and a differential field winding; a shaft connecting the motor and the generator; a flywheel connected to the shaft; a main load circuit and an auxiliary load circuit for the generator; a first switching means for connecting the auxiliary load circuit to the generator; a direct current power conductor; a second switching means for connecting the motor to the power conductor; rectifying means for energizing the differential field winding of the motor and the cumulative field winding of the generator with a current proportional to the load current of the generator; additional rectifying means for energizing the cumulative field winding of the motor and the differential field winding of the generator with a current proportional to the generator voltage; a reverse current relay responsive to the motor armature current for causing the opening of said second switching means; and relay means responsive to the voltage of the power conductor for causing the opening of said first switching means, said motor and generator being driven by stored energy in said flywheel and said main field windings being energized by current generated in said motor while it is disconnected from the power conductor.

6. In a control system, in combination, a direct current motor having an armature winding, a main field winding, a cumulative field winding and a differential field winding; an alternating current generator having an armature winding, a main field winding, a cumulative field winding and a differential field winding; a shaft connecting the motor and the generator; a flywheel connected to the shaft; a main load circuit and an auxiliary load circuit for the generator; a first switching means for connecting the auxiliary load circuit to the generator; a direct current power conductor; a second switching means for connecting the motor to the power conductor; rectifying means for energizing the differential field winding of the motor and the cumulative field winding of the generator with a current proportional to the load current of the generator; additional rectifying means for energizing the cumulative field winding of the motor and the differential field winding of the generator with a current proportional to the generator voltage; a reverse current relay responsive to the motor armature current for causing the opening of said second switching means; relay means responsive to the voltage of the power conductor for causing the opening of said first switching means, said motor and generator being driven by stored energy in said flywheel and said main field windings being energized by current generated in said motor while it is disconnected from the power conductor; and interlocking means on said second switching means for shunting the differential field winding of the motor.

7. In a control system, in combination, a direct current motor having an armature winding, a main field winding, a cumulative field winding and a differential field winding; an alternating current generator having an armature winding, a main field winding, a cumulative field winding and a differential field winding; a shaft connecting the motor and the generator; a flywheel connected to the shaft; a main load circuit and an auxiliary load circuit for the generator; a first switching means for connecting the auxiliary load circuit to the generator; a direct current power conductor; a second switching means for connecting the motor to the power conductor; rectifying means for energizing the differential field winding of the motor and the cumulative field winding of the generator with a current proportional to the load current of the generator; additional rectifying means for energizing the cumulative field winding of the motor and the differential field winding of the generator with a current proportional to the generator voltage; a reverse current relay responsive to the motor armature current for causing the opening of said second switching means; relay means responsive to the voltage of the power conductor for causing the opening of said first switching means, said motor and generator being driven by stored energy in said flywheel and said main field windings being energized by current generated in said motor while it is disconnected from the power conductor; resistors for controlling the current in the motor armature winding; and relay means responsive to the generator voltage for shunting said resistors.

HERBERT W. GRAYBROOK.
MANLEY C. POTTER.

No references cited.